United States Patent
Kumar et al.

(10) Patent No.: US 11,244,058 B2
(45) Date of Patent: Feb. 8, 2022

(54) SECURITY TOOL

(71) Applicant: BANK OF AMERICA CORPORATION, Charlotte, NC (US)

(72) Inventors: Hitendra Kumar, Ghaziabad (IN); Scott Bolduc, Ft. Mill, SC (US); Rakesh Jain, Lucknow (IN)

(73) Assignee: Bank of America Corporation, Charlotte, NC (US)

( * ) Notice: Subject to any disclaimer, the term of this patent is extended or adjusted under 35 U.S.C. 154(b) by 350 days.

(21) Appl. No.: 16/574,865

(22) Filed: Sep. 18, 2019

(65) Prior Publication Data

US 2021/0081540 A1  Mar. 18, 2021

(51) Int. Cl.
| | |
|---|---|
| *G06F 21/57* | (2013.01) |
| *G06F 8/65* | (2018.01) |
| *G06F 8/41* | (2018.01) |
| *G06F 8/53* | (2018.01) |
| *G06F 8/30* | (2018.01) |

(52) U.S. Cl.
CPC .............. *G06F 21/577* (2013.01); *G06F 8/65* (2013.01); *G06F 8/30* (2013.01); *G06F 8/41* (2013.01); *G06F 8/53* (2013.01); *G06F 2221/033* (2013.01)

(58) Field of Classification Search
CPC . G06F 21/577; G06F 8/65; G06F 8/30; G06F 8/41; G06F 8/53; G06F 2221/033
See application file for complete search history.

(56) References Cited

U.S. PATENT DOCUMENTS

| | | |
|---|---|---|
| 5,237,614 A | 8/1993 | Weiss |
| 5,414,833 A | 5/1995 | Hershey et al. |
| 5,787,177 A | 7/1998 | Leppek |
| 5,828,832 A | 10/1998 | Holden et al. |
| 5,940,591 A | 8/1999 | Boyle et al. |
| 6,088,451 A | 7/2000 | He et al. |
| 6,119,236 A | 9/2000 | Shipley |
| 6,199,113 B1 | 3/2001 | Allegre et al. |
| 6,301,668 B1 | 10/2001 | Gleichauf et al. |
| 6,353,886 B1 | 3/2002 | Howard et al. |
| 6,499,107 B1 | 12/2002 | Gleichauf et al. |
| 6,611,869 B1 | 8/2003 | Eschelbeck et al. |
| 6,678,827 B1 | 1/2004 | Rothermel et al. |
| 7,058,970 B2 | 6/2006 | Shaw |
| 7,086,089 B2 | 8/2006 | Hrastar et al. |
| 7,100,054 B2 | 8/2006 | Wenisch et al. |
| 7,225,468 B2 | 5/2007 | Waisman et al. |
| 7,228,438 B2 | 6/2007 | Bushmitch et al. |
| 7,249,374 B1 | 7/2007 | Lear et al. |
| 7,360,087 B2 | 4/2008 | Jorgensen et al. |

(Continued)

*Primary Examiner* — Phillip H Nguyen

(57) ABSTRACT

An apparatus includes a memory and a hardware processor. The memory stores a plurality of conversion rules. The processor receives a first log from a server. The first log indicates that the server attempted to install a software patch. The processor converts, based on the plurality of conversion rules, the first log into a different format to produce a second log and extracts a plurality of words from the second log. The processor also determines, based on the extracted words, that the software patch install failed and determines, based on the extracted words, a cause for the software patch install failure. The processor further determines a series of steps to remedy the cause and perform the series of steps to remedy the cause.

20 Claims, 3 Drawing Sheets

(56) References Cited

U.S. PATENT DOCUMENTS

| | | |
|---|---|---|
| 7,392,537 B2 | 6/2008 | Satomaa et al. |
| 7,398,389 B2 | 7/2008 | Teal et al. |
| 7,437,755 B2 | 10/2008 | Farino et al. |
| 7,475,137 B2 | 1/2009 | Holden et al. |
| 7,735,114 B2 | 6/2010 | Kwan et al. |
| 8,046,835 B2 | 10/2011 | Herz |
| 8,065,725 B2 | 11/2011 | Zheng et al. |
| 8,230,480 B2 | 7/2012 | Fazal et al. |
| 8,261,347 B2 | 9/2012 | Hrabik et al. |
| 8,327,442 B2 | 12/2012 | Herz et al. |
| 8,539,571 B2 | 9/2013 | Smith |
| 8,561,139 B2 | 10/2013 | Singhal |
| 8,578,441 B2 | 11/2013 | Giles et al. |
| 8,972,963 B2 | 3/2015 | Baset et al. |
| 9,077,746 B2 | 7/2015 | Chandrashekhar et al. |
| 9,215,244 B2 | 12/2015 | Ayyagari et al. |
| 9,471,474 B2 * | 10/2016 | Gurumurthy ......... G06F 11/079 |
| 9,513,895 B2 | 12/2016 | Inamdar |
| 9,710,253 B2 | 7/2017 | Bansod |
| 9,959,111 B2 | 5/2018 | Plate et al. |
| 10,084,645 B2 | 9/2018 | Bouz et al. |
| 10,101,991 B2 | 10/2018 | Bansod |
| 10,108,482 B2 | 10/2018 | Kumar et al. |
| 10,289,403 B1 | 5/2019 | Krishnaswamy et al. |
| 2003/0051235 A1 * | 3/2003 | Simpson .................. G06F 8/60 717/174 |
| 2011/0083123 A1 * | 4/2011 | Lou ..................... G06F 11/0706 717/125 |
| 2014/0157040 A1 * | 6/2014 | Bennah ............... G06F 11/0793 714/2 |
| 2014/0157058 A1 * | 6/2014 | Bennah .................. G06F 11/34 714/38.1 |
| 2016/0092286 A1 * | 3/2016 | Henley ..................... G06F 8/00 714/57 |
| 2016/0092338 A1 * | 3/2016 | Henley ................. G06F 11/327 717/125 |
| 2018/0203757 A1 * | 7/2018 | Akune ................ G06F 11/3476 |

* cited by examiner

SECURITY TOOL

TECHNICAL FIELD

This disclosure relates generally to security.

BACKGROUND

Software patching improves the security of computer systems by fixing security vulnerabilities.

SUMMARY OF THE DISCLOSURE

Software patching improves the security of computer systems by fixing security vulnerabilities. When a security vulnerability is identified in a system (e.g., in a server), software patches are typically released to address the security vulnerability. These patches are installed onto system components (e.g., servers) to protect these components against the security vulnerability.

Certain systems include tens of thousands of servers, each susceptible to different security vulnerabilities. In some installations, over 40,000 software patches could be installed per month. Some of these patch installations fail for a variety of reasons. For example, patch installation may fail when there are sudden power outages, when certain servers are offline, and/or when the patches themselves contain bugs or errors. Because patches are typically intended to resolve security vulnerabilities, these patch installation failures expose the systems to security threats. Thus, resolving these installation failures in a timely manner (e.g., within six hours of failure) is important to maintaining the security of the system.

A customary way of discovering the cause of a patch installation failure is for an administrator to review a log on a server on which patch installation failed. However, these logs may be difficult to understand, making it difficult for the administrator to diagnose the cause of the installation failure. When this problem is repeated across tens of thousands of servers, it may become impossible for the administrator to review every log, diagnose every problem, and resolve every problem within the desired time window. As a result, the servers in the system may remain susceptible to security threats.

This disclosure contemplates a security tool that can review server logs and automatically diagnose the causes of patch installation failures and remedy those causes. The security tool can also use natural language processing algorithms to convert the information in the server logs into a different format that is easier for a human to understand (e.g., using plain English). As a result, even if the security tool is unable to identify or remedy a particular patch installation failure, an administrator can review the converted log and quickly diagnose and remedy the issue. The security tool can apply any suitable remedy. For example, the security tool can change server settings or decompile the patch and adjust its source code. In certain instances, the security tool can also predict when another patch installation will fail and remedy the cause of that failure before a server attempts to install that patch. In this manner, the security tool maintains and/or improves the security of the system by overcoming software patch installation failures.

According to an embodiment, an apparatus includes a memory and a hardware processor. The memory stores a plurality of conversion rules. The processor receives a first log from a server. The first log indicates that the server attempted to install a software patch. The processor converts, based on the plurality of conversion rules, the first log into a different format to produce a second log and extracts a plurality of words from the second log. The processor also determines, based on the extracted words, that the software patch install failed and determines, based on the extracted words, a cause for the software patch install failure. The processor further determines a series of steps to remedy the cause and perform the series of steps to remedy the cause.

According to another embodiment, a method includes storing, by a memory, a plurality of conversion rules and receiving, by a hardware processor communicatively coupled to the memory, a first log from a server. The first log indicates that the server attempted to install a software patch. The method also includes converting, by the processor, based on the plurality of conversion rules, the first log into a different format to produce a second log and extracting, by the processor, a plurality of words from the second log. The method further includes determining, by the processor, based on the extracted words, that the software patch install failed and determining, by the processor, based on the extracted words, a cause for the software patch install failure. The method also includes determining, by the processor, a series of steps to remedy the cause and performing, by the processor, the series of steps to remedy the cause.

According to yet another embodiment, a system includes a plurality of servers and a security tool. The security tool includes a memory and a hardware processor communicatively coupled to the memory. The memory stores a plurality of conversion rules. The processor receives a first log from a server of the plurality of servers. The first log indicates that the server attempted to install a software patch. The processor also converts, based on the plurality of conversion rules, the first log into a different format to produce a second log and extracts a plurality of words from the second log. The processor further determines, based on the extracted words, that the software patch install failed and determines, based on the extracted words, a cause for the software patch install failure. The processor also determines a series of steps to remedy the cause and performs the series of steps to remedy the cause.

Certain embodiments provide one or more technical advantages. For example, an embodiment improves security by remedying the causes of software patch installation failures. As another example, an embodiment improves security by predicting software patch installation failures and remedying the causes of these failures before attempting to install the software patches. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
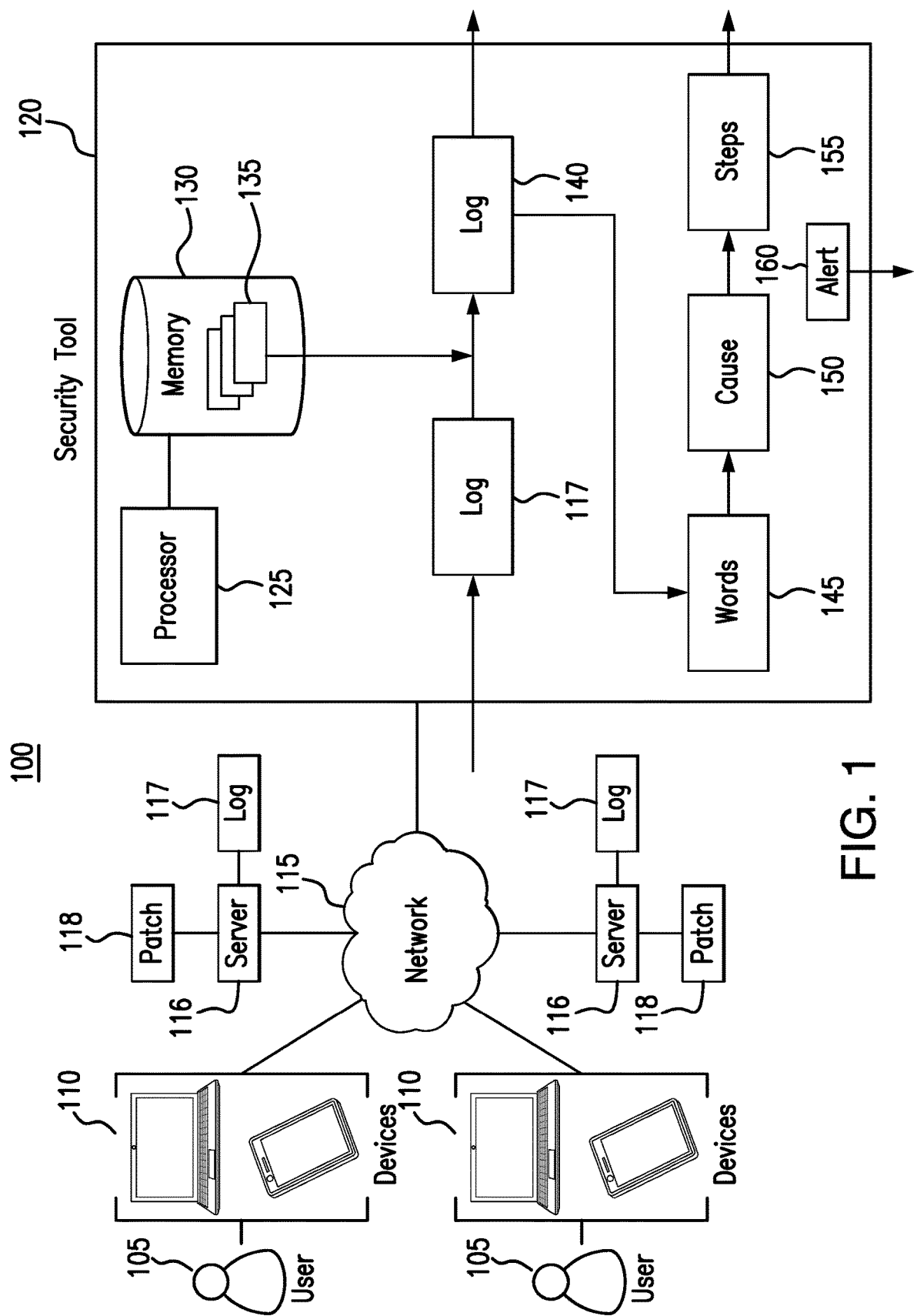
FIG. 1 illustrates an example system.
Figure 2:
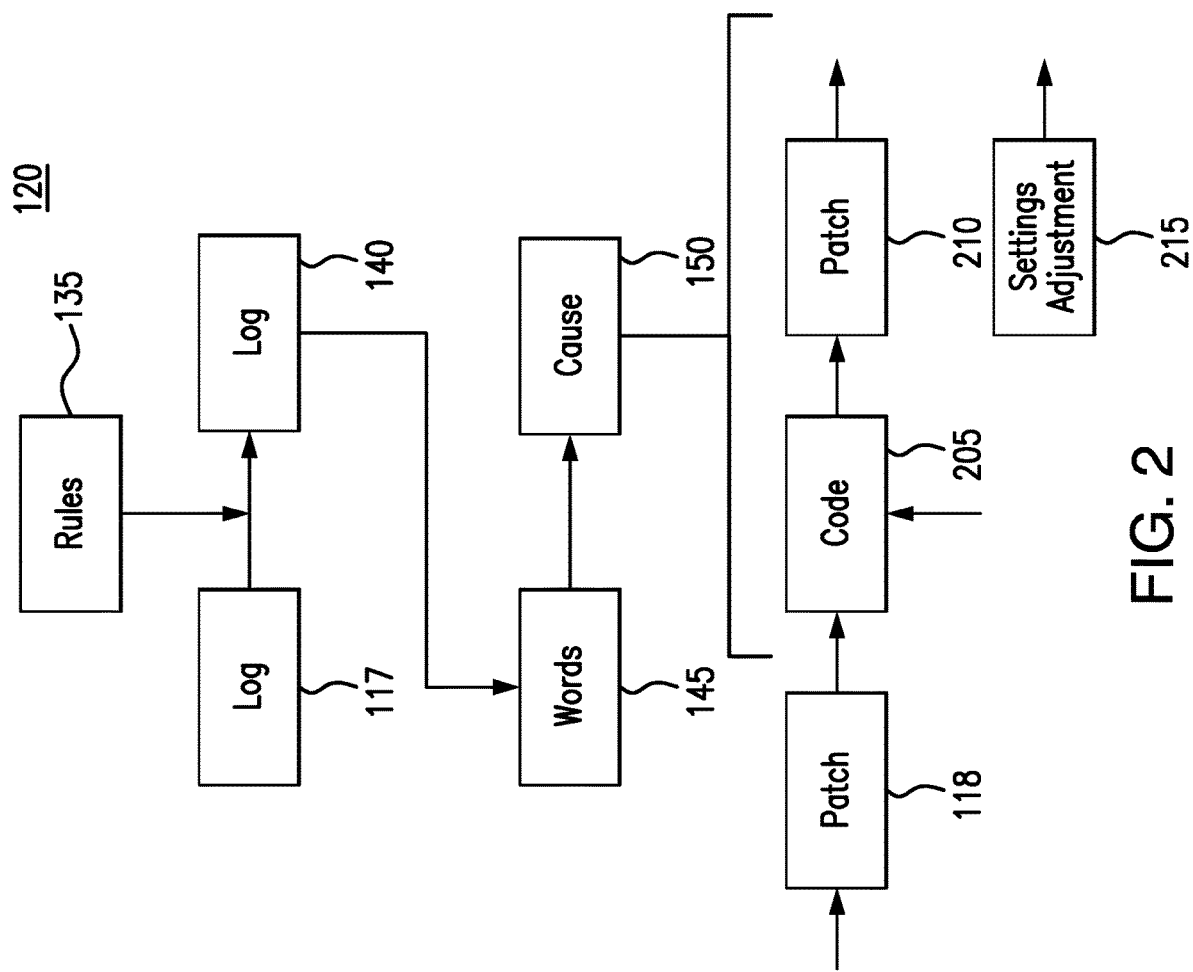
FIG. 2 illustrates an example security tool of the system of FIG. 1.
Figure 3:
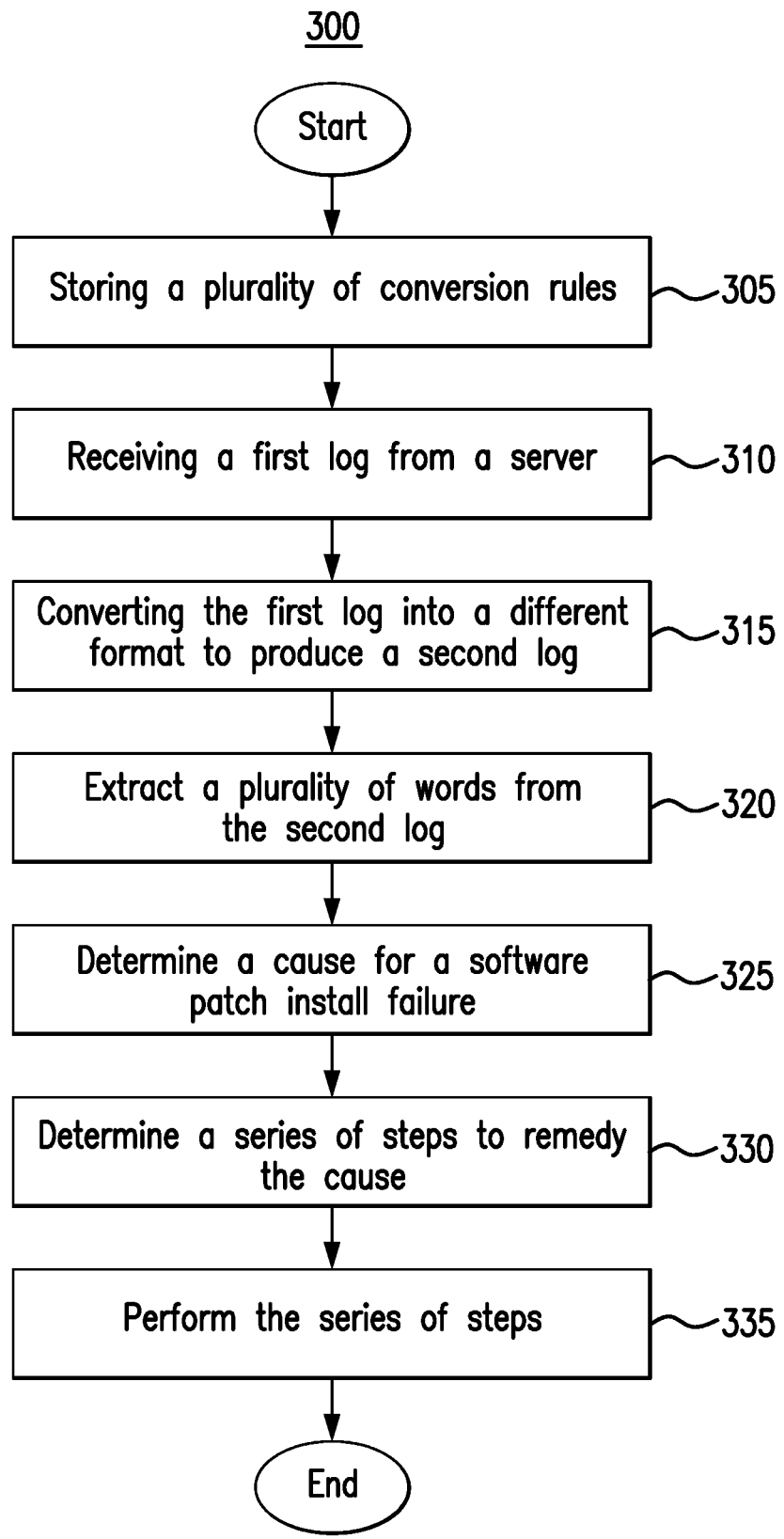
FIG. 3 is a flowchart illustrating a method for improving security using the system of FIG. 1.

Embodiments of the present disclosure and its advantages are best understood by referring to FIGS. 1 through 3 of the drawings, like numerals being used for like and corresponding parts of the various drawings.

Software patching improves the security of computer systems by fixing security vulnerabilities. When a security vulnerability is identified in a system (e.g., in a server), software patches are typically released to address the security vulnerability. These patches are installed onto system components (e.g., servers) to protect these components against the security vulnerability.

Certain systems include tens of thousands of servers, each susceptible to different security vulnerabilities. In some installations, over 40,000 software patches could be installed per month. Some of these patch installations fail for a variety of reasons. For example, patch installation may fail when there are sudden power outages, when certain servers are offline, and/or when the patches themselves contain bugs or errors. Because patches are typically intended to resolve security vulnerabilities, these patch installation failures expose the systems to security threats. Thus, resolving these installation failures in a timely manner (e.g., within six hours of failure) is important to maintaining the security of the system.

A customary way of discovering the cause of a patch installation failure is for an administrator to review a log on a server on which patch installation failed. However, these logs may be difficult to understand, making it difficult for the administrator to diagnose the cause of the installation failure. When this problem is repeated across tens of thousands of servers, it may become impossible for the administrator to review every log, diagnose every problem, and resolve every problem within the desired time window. As a result, the servers in the system may remain susceptible to security threats.

This disclosure contemplates a security tool that can review server logs and automatically diagnose the causes of patch installation failures and remedy those causes. The security tool can also use natural language processing algorithms to convert the information in the server logs into a different format that is easier for a human to understand (e.g., using plain English). As a result, even if the security tool is unable to identify or remedy a particular patch installation failure, an administrator can review the converted log and quickly diagnose and remedy the issue. The security tool can apply any suitable remedy. For example, the security tool can change server settings or decompile the patch and adjust its source code. In certain instances, the security tool can also predict when another patch installation will fail and remedy the cause of that failure before a server attempts to install that patch. In this manner, the security tool maintains and/or improves the security of the system by overcoming software patch installation failures. The security tool will be described in more detail using FIGS. 1 through 3.

FIG. 1 illustrates an example system 100. As seen in FIG. 1, system 100 includes one or more devices 110, a network 115, one or more servers 116, and a security tool 120. Generally, system 100 applies software patches to servers 116 to address security vulnerabilities. When patch installations fail, system 100 automatically diagnoses and remedies the causes of the installation failures. In this manner, the security of the components of system 100 is improved in certain embodiments.

Devices 110 are used to interact with other components of system 100. For example, devices 100 may be used to initiate a software patch installation on a server 116. As another example, device 110 may be used to communicate commands to security tool 120 and to receive analysis and steps from security tool 120. Devices 110 may be administrator devices used to determine the causes of software patch installation failures. Devices 110 may also be used to remedy the causes of software patch installation failures. For example, an administrator may use devices 110 to adjust settings on servers 116 to remedy installation failures.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 allows communication between and amongst the various components of system 100. For example, user 105 may use devices 110 to communicate over network 115. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 116 may be any component that performs a service or function for a component of system 100. Server 116 may include any suitable hardware and/or software for performing the service or function. For example, server 116 may include a hardware processor, a memory, and software instructions that when executed, perform the function or service. Each server 116 may include separate hardware and/or software from another component of system 100. In certain instances, server 116 may receive requests from devices 110 and perform certain services and/or functions in response to those requests. This disclosure contemplates system 100 including any suitable number of servers 116. For example, system 100 may include hundreds of thousands of servers 116. Each server 116 may perform a specific service and/or function.

Each server 116 may be susceptible to security vulnerabilities. For example, each server 116 may be susceptible to intrusions by malicious users. If a malicious user accesses a server 116, the malicious user may install malicious software on server 116 or take personal information of other users 105 from server 116. It is thus important to resolve security vulnerabilities on servers 116 to protect users 105 and other components of system 100. One way to address security vulnerabilities in a server 116 is to install a software patch 118 on server 116. The software patch 118 may resolve a security vulnerability when properly installed on server 116. Each patch 118 may be specifically configured for a particular server 116. Thus, when system 100 includes thousands of servers 116, thousands of different patches 118 may be deployed in system 100 to address security vulnerabilities in servers 116.

When a patch installation is attempted or performed on a server 116, that server 116 updates a log 117 for that server 116. Log 117 indicates the steps that were performed on server 116. For example, log 117 may indicate that a patch 118 is to be installed on server 116. Log 117 may also indicate the time and date of the installation. Log 117 may also indicate the steps that were performed on server 116 during the installation of the patch 118. Log 117 may also indicate any abnormalities or unexpected occurrences during patch installation. Log 117 may also indicate whether the patch installation was a success or failure. Each server 116 may maintain its own log 117.

In certain instances, installation of a patch 118 may fail. Failures may result from any number of causes. For example, a patch installation may fail because a server 116 was offline. As another example, the patch installation may fail because a server 116 was processing a job or not ready for patch installation. As yet another example, a patch installation may fail because a server 116 was starting up or shutting down. In some instances, a patch installation may fail because the patch itself includes a bug or error. When a patch installation fails, log 117 may be updated to reflect the conditions of server 116 and to indicate the failure. In some instances, when the patch installation fails, log 117 may not be updated to reflect the failure.

In certain installations, an administrator of system 100 reviews each log 117 of each server 116 to determine whether patch installations succeeded or failed. The administrator also discerns from log 117 the cause of an installation failure. The administrator may then work to remedy that cause and to restart the installation. Because patches 118 address security vulnerabilities in a server 116, the administrator may have a limited time in which to diagnose the cause of the installation failure and to remedy that cause. Otherwise, servers 116 may be susceptible to security breaches for an extended period of time, which jeopardizes the security of system 100. When system 100 includes hundreds of thousands of servers 116, it may be impossible for the administrator to review every log 117 for every installation failure and to diagnose and remedy the causes of these failures within the time window for resolving installation failures. As a result, in these systems the security vulnerabilities may continue to linger, thus jeopardizing the security of system 100.

Security tool 120 improves the security of the components of system 100 and relieves the burden on administrators by automatically diagnosing and remedying the causes of software patch installation failures in certain embodiments. As seen in FIG. 1, security tool 120 includes a processor 125 and a memory 130. This disclosure contemplates processor 125 and memory 130 being configured to perform any of the functions of security tool 120. In particular embodiments, security tool 120 improves the security of system 100 by converting logs 117 to a format that is easier for an administrator to understand and by diagnosing and remedying causes of installation failures.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware that operates software to control and process information. Processor 125 executes software stored on memory to perform any of the functions described herein. Processor 125 controls the operation and administration of security tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 120 stores one or more conversion rules 135. Security tool 120 uses conversion rules 135 to convert logs 117 to different formats. In certain instances, security tool 120 uses conversion rules 135 to convert logs 117 into formats that are easier for a human to understand. In this manner, an administrator may review a converted log and quickly detect an installation failure and quickly discern the cause of that installation failure. This disclosure contemplates that conversion rules 135 may include natural language processing rules that specify how certain words or word combinations in a log should be translated so that a human can more easily understand the meaning of those words or word combinations. Security tool 120 may apply and follow these conversion rules 135 to translate or convert a log 117.

Security tool 120 receives a log 117 from a server 116. Log 117 indicates the results of a software patch installation on server 116. Security tool 120 may request log 117 from a server 116. Security tool 120 may also receive log 117 as a result of server 116 pushing log 117 to security tool 120. Log 117 may indicate that a software patch installation on server 116 failed. However, log 117 may be difficult for security tool 120 or an administrator to understand.

Security tool 120 uses conversion rules 135 to convert log 117 to log 140. Log 140 may be in a different format from log 117. In certain instances, log 140 may be easier for security tool 120 and/or an administrator to understand. Security tool 120 may analyze log 140 to determine that a software patch installation failed and the cause of that failure. Security tool 120 may translate the text in log 117 into easier-to-understand plain-language text in log 140. This conversion may use conversion rules 135 to apply natural language processing principles to the words in log 117. In certain embodiments, this conversion may allow an administrator to review log 140 and to quickly detect and diagnose the cause of a software patch installation failure. Security tool 120 extracts words 145 from log 140. Security tool 120 analyzes the extracted words 145 to determine that a software patch installation failed. Security tool 120 also analyzes words 145 to determine a cause 150 of the failure. For example, words 145 may indicate a software patch installation failed because the server 116 was offline when installation was attempted. As another example, words 145 may indicate that a software patch installation failed because the server was processing a job when installation was attempted. As yet another example, words 145 may indicate that the software patch installation failed because the software patch included a bug or an error. Security tool 120 may determine cause 150 and the remedy for the cause 150.

Security tool 120 may determine steps 155 to remedy cause 150. Security tool 120 may have learned steps 155 from an administrator or from previous patch installation failures. For example, security tool 120 may have learned from previous software patch installation failures that a software patch installation should be reattempted at a later time if the cause 150 of the software patch installation failure was that the server 116 was offline when the software patch installation was attempted. As yet another example, security tool 120 may have learned from previous software patch installation failures that certain registry keys in the server 116 should be reconfigured if the cause of the software patch installation failure was that a path or storage location of the software patch was incorrect. As yet another example, security tool 120 may have learned that a software patch should be decompiled and its source code adjusted if the software patch installation failure was cause by a bug or error in the software patch itself. Security tool 120 may communicate steps 155 to an administrator so that the administrator can take appropriate steps to address the software patch installation failure. In certain embodiments, security tool 120 performs steps 155 automatically to remedy cause 150 and to attempt installation of the software patch. In this manner, security tool 120 quickly and successfully addresses security vulnerabilities in system 100.

In certain embodiments, security tool 120 may use cause 150 to predict future software patch installation failures. For example, if a software patch installation on a server 116 failed because the server 116 was executing a scheduled job, security tool 120 may determine that the software patch installation should be reattempted in a few hours when the scheduled job is completed. Security tool 120 may further determine that future security patch installations will occur during the time when jobs are scheduled on server 116. In response, security tool 120 may determine further steps 155 to proactively prevent future software patch installation failures. For example, security tool 120 may adjust the schedule on server 116 so that the job is not scheduled during a software patch installation window. As yet another example, security tool 120 may adjust the time during which software patches are installed on server 116 to avoid installing software patches when jobs are scheduled on server 116. In this manner, security tool 120 may determine additional and more insightful causes 150 of software patch installation failures and additional steps 155 for addressing those predicted failures.

In certain embodiments, security tool 120 may generate and communicate an alert 160 that alerts an administrator of a software patch installation failure. The alert 160 may also indicate cause 150 and steps 155 for remedying cause 150. The administrator may then receive the alert 160 and address the software patch installation failure.

In particular embodiments, security tool 120 communicates log 140 to an administrator device 110. As a result, the administrator may review log 140 to determine the cause 150 of a security patch installation failure because log 140 includes easy-to-understand plain-language text. The administrator may read log 140 and quickly determine cause 150 and the remedy for cause 150. In instances, when security tool 120 cannot determine the cause 150 of a software patch installation failure, security tool 120 may monitor the steps that the administrator takes to remedy the cause 150 to learn how to resolve a particular software patch installation failure in the future.

In certain embodiments, security tool 120 can automatically attempt reinstallation of a software patch as part of performing steps 155. In this manner, no human interaction is needed to resolve a software patch installation failure and to successfully install the software patch.

FIG. 2 illustrates an example security tool 120 of the system 100 of FIG. 1. Generally, security tool 120 detects software patch installation failures and determines and remedies a cause of the software patch installation failure. In this manner, security tool 120 improves the security of system 100 by resolving errors that prevent software patches that resolve security vulnerabilities from successfully installing.

Security tool 120 receives a log 117 that indicates a software patch installation failure. Log 117 may have come from a server on which a security patch installation was attempted. Log 117 may be difficult for security tool 120 or a system administrator to understand. Security tool 120 applies one or more conversion rules 135 to convert log 117 into a second log 140 that is of a different format. For example, log 140 may include easier-to-understand plain-language text. Conversion rules 135 may be natural language processing rules that, when followed, allow security tool 120 to translate harder-to-understand text in log 117 into easier-to-understand text in log 140.

Security tool 120 may analyze the words of log 140. Security tool 120 may extract words 145 from log 140. These words may indicate a security patch installation failure and a cause 150 of the failure. Security tool 120 may determine a cause 150 of the security patch installation failure based on words 145. Security tool 120 may then determine a series of steps for remedying cause 150.

In the example of FIG. 2, security tool 120 may have determined that the cause 150 of a software patch installation failure is that the patch included a bug or error. In response, security tool 120 may determine a series of steps that include decompiling the software patch and adjusting the source code to resolve the bug or error. Security tool 120 receives patch 118. Patch 118 may have been sent by a server on which installation failed. Security tool 120 may decompile patch 118 to produce source code 205. Security tool 120 may then change or adjust source code 205 to remedy the bug or error that caused the software patch installation failure. Security tool 120 may then recompile the adjusted source code 205 to produce a software patch 210. Security tool 120 may then communicate software patch 210 to the server 116 and attempt installation of software patch 210. Because the bug or error in software patch 118 was resolved, the installation of software patch 210 should succeed.

Security tool 120 may adjust the source code using any suitable means. For example, security tool 120 may employ machine learning processes that track previous source code adjustments made to address various bugs and errors. Security tool 120 may scan the source code to detect these bugs and errors. When detected, the machine learning processes may determine the appropriate fix for the bug or error by referring to the previous source code adjustments. If a previous source code adjustment successfully resolved the same bug or error, security tool 120 may automatically apply the same source code adjustment to source code 205.

In certain instances, security tool 120 may also determine settings adjustments 215 to remedy cause 150. For example, if cause 150 indicates that software patch installation failed because certain registry keys on the server 116 were incorrect, settings adjustment 215 may indicate the registry keys on the server 116 that should be changed to allow for successful installation of software patch 118. Security tool 120 may communicate settings adjustments 215 to the server 116 to adjust those registry keys. After the settings have been adjusted, security tool 120 may attempt reinstallation of the software patch.

In this manner, security tool 120 determines and remedies the causes of software patch installation failures, thus resolving security vulnerabilities and improving the security of system 100 in certain embodiments.

FIG. 3 is a flowchart illustrating a method 300 for improving security using the system 100 of FIG. 1. In certain embodiments, security tool 120 performs the steps of method 300. By performing method 300, security tool 120 improves the security of system 100 by resolving software patch installation failures that address security vulnerabilities.

Security tool 120 begins by storing a plurality of conversion rules in step 305. These conversion rules may be natural language processing rules that allow security tool 120 to convert server logs into easier-to-understand plain-language logs. In step 310, security tool 120 receives a first log from a server. Security tool 120 converts the first log into a different format to produce a second log in step 315. Security tool 120 may use the conversion rules to perform this conversion.

Security tool 120 extracts a plurality of words from the second log in step 320. In step 325, security tool 120 determines a cause for a software patch install failure based on these extracted words. Security tool 120 determines a series of steps to remedy the causes in step 330. In step 335, security tool 120 performs the series of steps to remedy the cause. Security tool 120 may reattempt the installation of the software patch after the series of steps have been performed. In this manner, security tool 120 may automatically determine and remedy the cause of a software patch installation failure and successfully install the software patch.

Modifications, additions, or omissions may be made to method 300 depicted in FIG. 3. Method 300 may include more, fewer, or other steps. For example, steps may be performed in parallel or in any suitable order. While discussed as security tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of conversion rules; and
a hardware processor communicatively coupled to the memory, the hardware processor configured to:
receive a first log from a server, the first log indicating that the server attempted to install a software patch;
convert, based on the plurality of conversion rules, the first log into a different format to produce a second log;
extract a plurality of words from the second log;
determine, based on the extracted words, that the software patch install failed;
determine, based on the extracted words, a cause for the software patch install failure;
determine a series of steps to remedy the cause; and
perform the series of steps to remedy the cause.

2. The apparatus of claim 1, wherein the hardware processor is further configured to:
determine, based on the cause, that the server will experience a second failure when installing a second software patch;
determine a second cause for the second failure; and
perform a second series of steps to remedy the second cause before the server attempts to install the second software patch.

3. The apparatus of claim 1, wherein the hardware processor is further configured to communicate an alert indicating the software patch install failure, the cause, and the series of steps.

4. The apparatus of claim 1, wherein the hardware processor is further configured to communicate the second log to an administrator device.

5. The apparatus of claim 1, wherein the hardware processor is further configured to reinstall the software patch after performing the series of steps.

6. The apparatus of claim 1, wherein the series of steps comprises:
decompiling the software patch;
changing software code for the software patch; and
recompiling the software patch.

7. The apparatus of claim 1, wherein the series of steps comprises adjusting a setting on the server.

8. A method comprising:
storing, by a memory, a plurality of conversion rules;
receiving, by a hardware processor communicatively coupled to the memory, a first log from a server, the first log indicating that the server attempted to install a software patch;
converting, by the processor, based on the plurality of conversion rules, the first log into a different format to produce a second log;
extracting, by the processor, a plurality of words from the second log;
determining, by the processor, based on the extracted words, that the software patch install failed;
determining, by the processor, based on the extracted words, a cause for the software patch install failure;
determining, by the processor, a series of steps to remedy the cause; and
performing, by the processor, the series of steps to remedy the cause.

9. The method of claim 8, further comprising:
determining, based on the cause, that the server will experience a second failure when installing a second software patch;
determining a second cause for the second failure; and
performing a second series of steps to remedy the second cause before the server attempts to install the second software patch.

10. The method of claim 8, further comprising communicating an alert indicating the software patch install failure, the cause, and the series of steps.

11. The method of claim 8, further comprising communicating the second log to an administrator device.

12. The method of claim 8, further comprising reinstalling the software patch after performing the series of steps.

13. The method of claim 8, wherein the series of steps comprises:
- decompiling the software patch;
- changing software code for the software patch; and
- recompiling the software patch.

14. The method of claim 8, wherein the series of steps comprises adjusting a setting on the server.

15. A system comprising:
- a plurality of servers; and
- a security tool comprising a memory and a hardware processor communicatively coupled to the memory, the memory configured to store a plurality of conversion rules, the hardware processor configured to:
  - receive a first log from a server of the plurality of servers, the first log indicating that the server attempted to install a software patch;
  - convert, based on the plurality of conversion rules, the first log into a different format to produce a second log;
  - extract a plurality of words from the second log;
  - determine, based on the extracted words, that the software patch install failed;
  - determine, based on the extracted words, a cause for the software patch install failure;
  - determine a series of steps to remedy the cause; and
  - perform the series of steps to remedy the cause.

16. The system of claim 15, wherein the hardware processor is further configured to:
- determine, based on the cause, that the server will experience a second failure when installing a second software patch;
- determine a second cause for the second failure; and
- perform a second series of steps to remedy the second cause before the server attempts to install the second software patch.

17. The system of claim 15, wherein the hardware processor is further configured to communicate an alert indicating the software patch install failure, the cause, and the series of steps.

18. The system of claim 15, wherein the hardware processor is further configured to communicate the second log to an administrator device.

19. The system of claim 15, wherein the hardware processor is further configured to reinstall the software patch after performing the series of steps.

20. The system of claim 15, wherein the series of steps comprises:
- decompiling the software patch;
- changing software code for the software patch; and
- recompiling the software patch.

* * * * *